US008375623B2

(12) United States Patent
Havens et al.

(10) Patent No.: US 8,375,623 B2
(45) Date of Patent: Feb. 19, 2013

(54) FISHING TRAP WITH DEGRADABLE CULL RING PANEL

(75) Inventors: Kirk J. Havens, Plainview, VA (US);
Donna Marie Bilkovic, Hayes, VA (US);
David M. Stanhope, Hayes, VA (US);
Kory T. Angstadt, Gloucester, VA (US)

(73) Assignee: College of William and Mary, Williamsburg, VA (US)

( * ) Notice: Subject to any disclaimer, the term of this patent is extended or adjusted under 35 U.S.C. 154(b) by 352 days.

(21) Appl. No.: 12/714,370

(22) Filed: Feb. 26, 2010

(65) Prior Publication Data

US 2010/0186283 A1     Jul. 29, 2010

Related U.S. Application Data

(63) Continuation-in-part of application No. 12/394,917, filed on Feb. 27, 2009, now abandoned.

(60) Provisional application No. 61/032,266, filed on Feb. 28, 2008.

(51) Int. Cl.
*A01K 69/06*     (2006.01)
*A01K 69/08*     (2006.01)
*A01K 69/00*     (2006.01)

(52) U.S. Cl. ............... 43/100; 43/4.5; 43/43.12
(58) Field of Classification Search ............ 43/100–105, 43/4, 4.5, 43.12
See application file for complete search history.

(56) References Cited

U.S. PATENT DOCUMENTS

| 1,728,645 | A | * | 9/1929 | Ward et al. | 43/100 |
| 3,426,472 | A | * | 2/1969 | Richard | 43/100 |
| 3,654,725 | A | * | 4/1972 | Kingston | 43/44.99 |
| 3,724,120 | A | * | 4/1973 | Richard | 43/100 |
| 3,842,529 | A | * | 10/1974 | Richard | 43/100 |
| 3,992,804 | A | * | 11/1976 | Senese | 43/100 |
| 4,159,591 | A | * | 7/1979 | Plante | 43/100 |
| 4,262,379 | A | * | 4/1981 | Jankiewicz | 43/100 |
| D259,434 | S | * | 6/1981 | Plante | D22/121 |
| D259,435 | S | * | 6/1981 | Plante | D22/121 |
| 4,445,295 | A | * | 5/1984 | Litrico | 43/102 |
| 4,648,199 | A | * | 3/1987 | Deaton et al. | 43/100 |
| 4,648,200 | A | * | 3/1987 | Miller et al. | 43/102 |
| 4,790,103 | A | * | 12/1988 | Tarantino | 43/102 |
| 5,244,731 | A | * | 9/1993 | Saito et al. | 43/44.98 |
| 5,259,809 | A | * | 11/1993 | Rainey, Jr. | 43/100 |
| 5,301,450 | A | * | 4/1994 | Boyd | 43/104 |
| 5,351,435 | A | * | 10/1994 | Hill | 43/100 |
| D367,695 | S | * | 3/1996 | Erlandson | D22/121 |
| 5,594,076 | A | * | 1/1997 | Gordon et al. | 43/44.98 |
| 5,890,316 | A | * | 4/1999 | Rodgers et al. | 43/43.16 |
| 5,894,694 | A | * | 4/1999 | Erlandson | 43/100 |
| 7,958,668 | B2 | * | 6/2011 | Walter et al. | 43/61 |
| 2005/0229477 | A1 | * | 10/2005 | Gomez | 43/100 |
| 2007/0261292 | A1 | * | 11/2007 | December | 43/100 |
| 2009/0249681 | A1 | | 10/2009 | Havens | |
| 2012/0144722 | A1 | * | 6/2012 | Havens et al. | 43/100 |

FOREIGN PATENT DOCUMENTS

DE           4324449 A1 *   1/1995
WO    WO 2010015013 A1 *   2/2010

* cited by examiner

*Primary Examiner* — Darren W Ark
(74) *Attorney, Agent, or Firm* — Jason P. McDevitt; Devanie DuFour

(57) ABSTRACT

Herein we describe crustacean fishing traps having degradable cull ring panels, as well as methods for ensuring that such traps have reduced functionality after becoming derelict. Derelict crab and lobster traps have a negative economic and ecological impact, and thus it is advantageous to use degradable traps that will lose their ability to catch and retain fish over time. Incorporating degradable cull ring panels into such traps provides an effective, economical solution. Suitable degradable cull ring panels are described herein.

6 Claims, 4 Drawing Sheets

FISHING TRAP WITH DEGRADABLE CULL RING PANEL

CROSS-REFERENCE TO RELATED APPLICATIONS

This application is a continuation-in-part of U.S. patent application Ser. No. 12/394,917, filed Feb. 27, 2009, which claims the benefit of and priority to U.S. Provisional Patent Application Ser. No. 61/032,266, filed Feb. 28, 2008, the entire disclosures of which are incorporated by reference herein.

STATEMENT REGARDING FEDERALLY SPONSORED RESEARCH AND DEVELOPMENT

This invention was made with government support under Grant No. NFWF 2006-0001-010, awarded by the National Oceanic and Atmospheric Administration and the National Fish and Wildlife Foundation, and Grant No. NA09-MNMF4520027 MRC, awarded by the National Oceanic and Atmospheric Administration. The government has certain rights in the invention.

FIELD OF INVENTION

The field of the invention relates to traps and methods for catching crabs and other crustaceans.

BACKGROUND OF THE INVENTION

Derelict (i.e., lost or abandoned) commercial fishing gear, including nets and traps, can present safety, nuisance, and environmental impacts in estuarine waters. Blue crabs and various fish species that are entrapped and die in derelict traps can act as an attractant to other crabs, resulting in a self-baiting effect. Derelict fishing gear damages sensitive habitat and continues to capture both target and by-catch species, leading to reduced fitness and significant acute and delayed mortalities. Animals captured in derelict traps can experience starvation, cannibalism, infection, disease, and prolonged exposure to poor water quality (i.e., low dissolved oxygen).

The number of derelict crab traps in the nation's estuaries is unknown. Typically, traps can become derelict for a number of reasons, e.g., buoy lines can be severed by vessel propellers or break due to age, buoy materials can fail, storms can roll the traps pulling the buoy below the surface, and traps can be vandalized or abandoned. In a pilot study in Virginia, the density of derelict pots in a specific crab fishing sector was determined to be about one pot per 28 square meters (587 ghost pots/16,400 m²) (Havens, K. J., et al. "The effects of derelict blue crab traps on marine organisms in the lower York River, Virginia", *North American Journal of Fisheries Management* (2008), 28, pp. 1194-1200).

It has been suggested that 250,000 derelict crab traps are added to the Gulf of Mexico annually, based on an estimated 25% loss/abandonment rate and an annual total number of traps fished commercially of approximately 1 million. The Gulf States Marine Fisheries Commission has estimated blue crab derelict fishery losses of as high as 4 to 10 million crabs a year in Louisiana (Guillory, V., et al., *Proceedings: Blue Crab Mortality Symposium,* Gulf State Marine Fisheries Commission (2001) Ocean Springs, Miss., pp. 28-41).

The effect of derelict blue crab traps on diamondback terrapins (*Malaclemys terrapin*) and commercially important finfish is significant, and various states and regions have enacted measures to reduce the ecological and economic impacts of derelict traps. For example, the state of Florida enacted regulations (CH 46-45, F.A.C., effective Jan. 1, 1995) establishing degradability requirements for blue crab traps. Traps are considered to have a legal degradable panel if panels are secured to each other using degradable materials such as jute twine or a corrodible hook. Unfortunately, many blue crab traps having such degradable panels or connections continue to trap and retain fish and crabs long after the degradable part has degraded. The same issues can occur with lobster traps.

It is desirable for crab traps to have cull rings, also called escape rings or escape hatches, to allow small and juvenile crabs to escape the trap. Typically, such cull rings have an inside diameter of at least 2.25 inches. For example, the state of Florida enacted regulations (CH 46-45, F.A.C., effective Jun. 1, 1994) requiring all blue crab traps to have at least 3 unobstructed escape rings installed, each with a minimum inside diameter of 2.375 inches. Lobster traps are also are required to have escape hatches of varying sizes, with the cull ring size dependent on the jurisdiction.

There remains a need for an improved degradable crab trap that, within a period of months after it becomes derelict, loses its ability to trap fish and crabs. To reduce the economic burden on fishermen, it would be advantageous if a degradable element could be inexpensively incorporated into existing traps for lobsters or crabs, thereby providing the desired degradability in derelict traps without requiring the purchase of expensive new traps.

BRIEF SUMMARY OF THE INVENTION

Herein we describe novel degradable cull ring panels for crustacean fishing traps, as well as crustacean fishing traps comprising degradable cull ring panels and methods for their use.

The degradable cull ring panels comprise a degradable physical barrier surrounding a degradable cull ring of a size typically used in crustacean fishing traps for crabs or lobsters. For example, the degradable cull ring panels can be used with traps for blue crabs (*Callinectes sapidus*) or other species of crabs, or lobsters. Accordingly, under normal use conditions for crabbing, the degradable barrier remains functionally intact, preventing the escape of large crabs, while small crabs escape through the cull ring. If a crab trap of the present invention becomes derelict, then the degradable barrier breaks down within 18 months, preferably within one fishing season, allowing trapped fish and crabs to escape.

The degradable physical barrier of the degradable cull ring panels can take a number of physical forms and designs, including a solid panel, a lattice, a mesh, a gated structure, or any other structure that prevents the escape of large crustaceans before the degradable barrier breaks down.

The degradable cull ring panels can be easily incorporated into existing crab traps, simply by cutting the existing wire mesh framework to produce a hole that is appropriately sized to accommodate the degradable cull ring panel, which is then secured into place using, for example, wire clips or ties made from degradable materials.

While degradable cull ring panels can be made from any materials which degrade under typical use conditions, i.e., an underwater marine environment, we have determined that preferred degradable cull ring panels are made from either a polycaprolactone polymer or a polyhydroxyalkanoate polymer, either of which can be degradable in marine environments. Moderating the rate of degradation can be achieved, for example, by altering: the molecular weight of the polymer, a coating on the polymer, surface imperfections, or the design of the cull ring panel.

BRIEF DESCRIPTION OF THE DRAWINGS

The summary above, and the following detailed description, will be better understood in view of the drawings which depict details of preferred embodiments.

DETAILED DESCRIPTION OF THE INVENTION

Figure 1A:
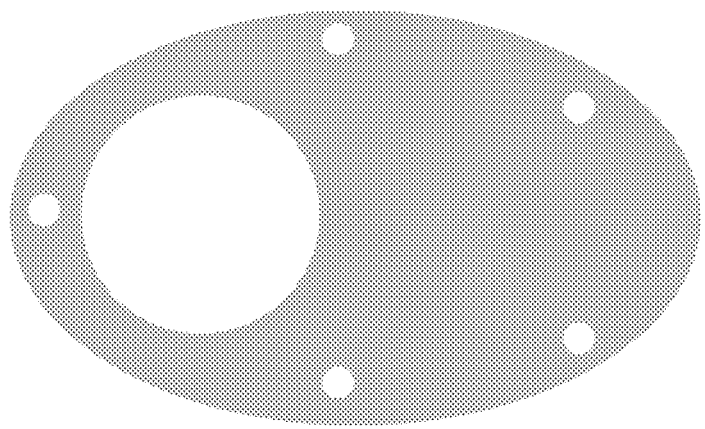
FIG. 1A shows a schematic top view of a representative degradable cull ring panel.

The present invention is directed to crab traps and lobster traps having degradable cull ring panels.

The term "degradable cull ring panel" refers to a panel that can be secured to a crab or lobster trap, wherein the panel degrades under marine conditions to yield an opening in the trap that permits trapped fish and shellfish to escape from a derelict trap. When the degradable cull ring panel is for a crab trap, the degradable cull ring panel initially contains an opening (a "cull ring") sufficient for escape of small crabs, with the size of said cull ring typically specified in local fishing regulations. This cull ring is typically circular, with a diameter of greater than two inches, although it is not required to be circular, notwithstanding the "ring" nomenclature. The degradable cull ring panel is larger than the cull ring itself, and the degradable cull ring panel must have an area of greater than 12 sq. inches, more typically greater than 16 sq. inches, to fulfill the desired function of allowing trapped fish and shellfish to escape. Typically, the degradable cull ring panel has a size comparable to the entrance openings of the crab trap.

When the degradable cull ring panel is for a lobster trap, the cull ring should have an area of at least the size specified in the applicable fishing regulations. Non-degradable escape vents are deployed in typical prior art lobster traps, and are generally simple plastic or wire squares that have an opening of about 2 inches by 6 inches, although the size varies by region according to the regulations. The escape vents are customarily placed in the parlor section of the trap. The vents are designed to allow small lobsters, fish, and crabs to escape, while marketable lobsters are retained as well as larger, non-targeted fish. Existing mechanisms to allow the escape of animals after a trap becomes derelict mainly involve a cut panel that is held by degradable string. The methods and articles of the present invention utilize fully degradable plastic that, upon decomposition, turns the escape vent into a larger section to allow the escape of most, if not all, trapped organisms. This provides a mechanism to render abandoned or lost traps ineffective in trapping and killing organisms. This approach is cost-effective, easy to enforce, and user-friendly because replacement degradable cull ring panels are easy to install.

Lobster trap regulations vary by region, and degradable cull ring panels of the present invention, when used in lobster traps, have a cull ring (typically not circular) of equal to or greater than the legally mandated size, with a cull ring panel having a significantly larger area sufficient to allow trapped adult lobsters to escape. Typically, cull rings in lobster traps are not circular and are often called "escape hatches", a term that can be used interchangeably.

The degradable cull ring panels of the present invention are designed to degrade, over a time period between about 3 months and 18 months, in an underwater marine environment. The underwater marine environments can have substantial variability in terms of pressure, temperature, salinity, and biodiversity. The degradable cull ring panels are designed such that the entire panel is degradable. While many plastics have been touted as being degradable, we have identified two plastics, polycaprolactone and polyhydroxyalkanoates, that are particularly effective as degradable cull ring panels according to the present invention.

Figure 1B:
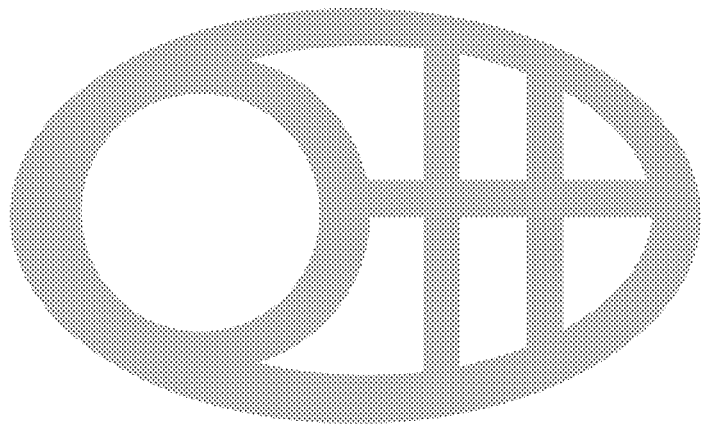
FIG. 1B shows a schematic top view of another representative embodiment of a degradable cull ring panel wherein the panel has an open lattice structure.

The degradable physical barrier of the degradable cull ring panels can take a number of forms, including a solid panel, a lattice, a mesh, a gated structure, or any other structure that prevents the escape of large crabs before the degradable barrier breaks down. For example, FIG. 1A and FIG. 1B depict representative degradable cull ring panels. In some embodiments, the degradable cull ring panel comprises a solid, impervious barrier surrounding the escape opening. In alternative embodiments, the degradable cull ring panel can have a lattice structure, a hub-and-spoke arrangement, or any other design that is suitable to render the cull ring panel degradable within the preferred time frame.

There is an important time component to the desired degradation. The degradable cull ring panel should not remain intact more than 18 months in a marine environment, and preferably will remain intact for no more than one fishing season. Accordingly, the size and shape of the material necessary to achieve the desired degradation is important. In practice, depending upon the geographic region, it is desirable for degradable cull ring panels to functionally degrade within about 3 months to 18 months, preferably within about 6 months to 12 months.

Figure 2:
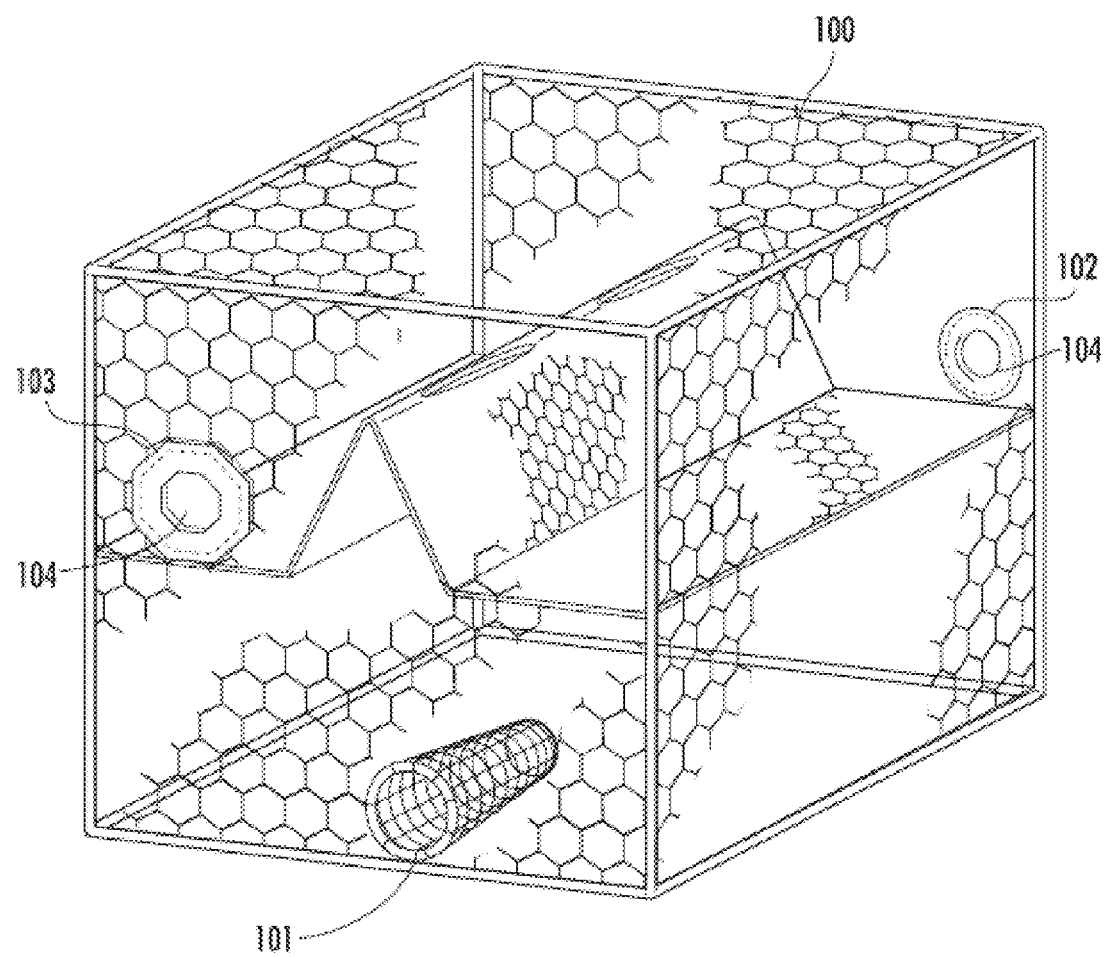
FIG. 2 shows a perspective view of a blue crab trap 100 that includes entrance funnel 101 and degradable cull ring panels 102 and 103, each of which contains a cull ring 104 within said degradable cull ring panels. Degradable cull ring panels 102 and 103 are distinct, representative embodiments of degradable cull ring panels of the present invention.
Figure 3A:
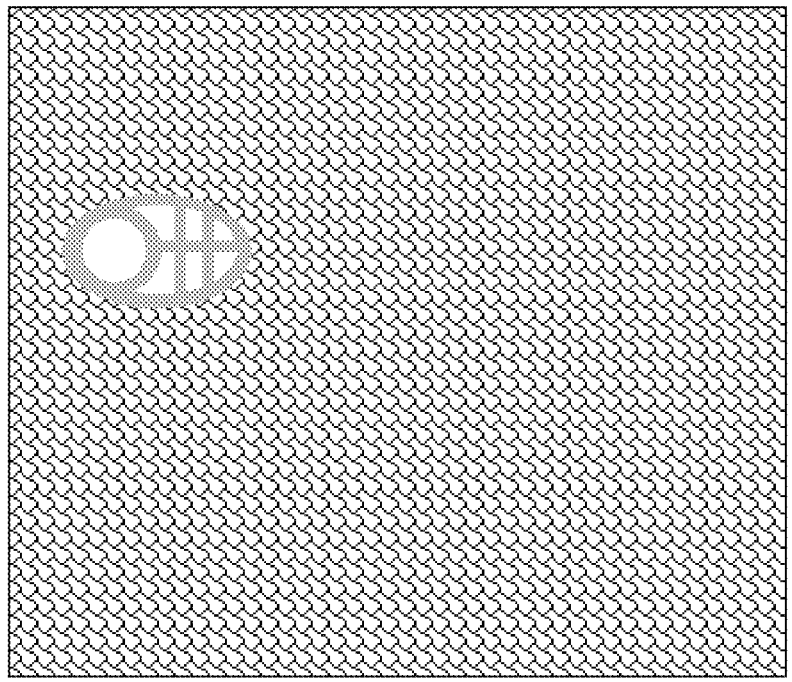
FIG. 3A shows a schematic diagram of a blue crab trap having a degradable cull ring panel prior to the onset of degradation.
Figure 3B:
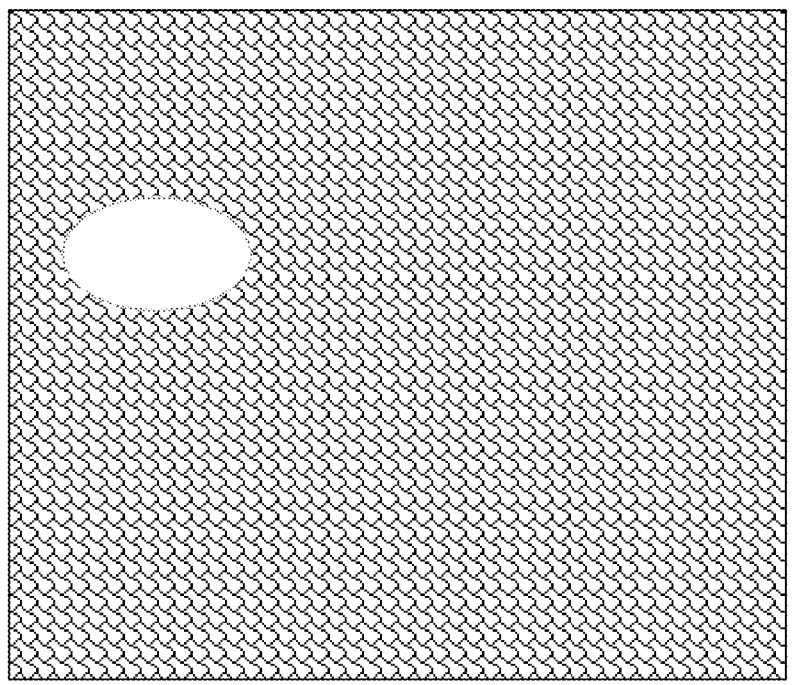
FIG. 3B shows a schematic diagram of a blue crab trap having a degradable cull ring panel that has degraded.

The degradable cull ring panels can be incorporated easily into existing crab traps, simply by cutting the existing wire mesh framework sufficiently to produce a hole large enough to accommodate the degradable cull ring panel, which is then secured into place using methods known in the art, including wire clips. In typical embodiments, degradable cull rings can be introduced at the following locations: the junction of two panels, in the upper chamber of a crab trap, and/or touching the upper partition floor of a crab trap or other locations where cull rings are typically installed. For example, FIG. 2 depicts a representative crab trap 100 having an entrance funnel 101 and degradable cull ring panels 102 and 103, each containing a cull ring 104 therein. In preferred embodiments, the cull ring itself is also degradable. FIG. 3A is a schematic diagram showing a crab trap with an intact degradable cull ring panel, while FIG. 3B shows the same crab trap after the degradable cull ring panel has degraded.

A reduction in the entrapment and potential injury or mortality of undersized crabs can be realized by proper placement of cull rings within crab traps and has implications for the placement and design of degradable cull ring panels. Placement of cull rings flush with the upper chamber floor or partition substantially increases the odds of escape within four hours of capture relative to crab traps with cull rings higher on the trap wall. Accordingly, it may be beneficial to utilize a degradable cull ring panel design and placement wherein the degradable cull ring of the degradable cull ring panel is placed flush with the upper chamber floor.

EXAMPLES

The examples that follow are intended in no way to limit the scope of this invention but instead are provided to illustrate representative embodiments of the present invention. Many other embodiments of this invention will be apparent to one skilled in the art.

Example 1

Active and derelict traps were assessed in two regions of the lower Chesapeake Bay to determine the fishing pressure and presence of derelict gear. During the crabbing season in October 2006, boat surveys were conducted and Global Positioning System (GPS) positions recorded for buoyed (active) traps over approximately 33.3 km$^2$ in the mainstem lower York River and approximately 0.2 km$^2$ in an adjacent tributary named Sarah Creek.

The number of derelict blue crab traps was estimated with a benthic mapping survey of the same area during non-fishing time periods (York River—January/February 2006; Sarah Creek-November 2005, resurveyed January/February 2006). Side-scan sonar technology mounted to the vessel hull was utilized (Marine Sonics Sea Scan, 600 KHz transducer) to collect real-time, geo-referenced data with overlapping edges matched to form a continuous profile of the bottom. The surveys were completed in 100 meter swaths with 20% overlap of tracks. This equipment provided high-resolution digital images of crab traps. Geo-referenced trap images were converted to Geographic Information Systems (GIS) shape files. Ground-truth activities included removing targets in Sarah Creek identified from side-scan sonar images as derelict crab traps to test the accuracy of trap identification. Potential errors in image identification were estimated from ratios of suspected derelict traps identified by side scan sonar to field verified derelict traps. Derelict traps were retrieved by boat using GPS coordinates obtained from the side scan sonar and a grappling hook. Nekton species captured in the derelict traps removed from the system were enumerated and measured. Derelict trap/buoyed trap ratio was used to estimate fishing pressure and potential trap loss. To assess the potential for annual trap loss, the Sarah Creek site was surveyed in the non-fishing season (fall/winter 2005) and derelict crab traps were removed. The area was re-surveyed in July 2006 for both active and derelict traps. Trap loss rates were estimated by comparing active (buoyed) traps and derelict traps over subsequent years.

To test trap degradation rates and blue crab catch rates, 28 unbaited, vinyl-coated, fully outfitted (escape/cull ring, rebar weight, zinc anode) traps were purchased from a commercial trap company and deployed in November 2005 to four areas of the York River across an average annual salinity gradient of 5.9% to 20.0% and a depth range from constantly submerged to periodic exposure at low tide. Twenty-eight additional traps were deployed to the same sites in April, 2006. November and April deployment dates were selected to mimic typical conditions wherein a trap is lost at the end of the crabbing season (November) or at the beginning of the crabbing season (April) in Virginia. Trap entrance funnels were modified to allow the funnels to be closed. The funnel entrances were opened for seven days of each month. Traps were opened and weighed (wet weight kilograms) to measure the amount and rate of encrustation which could impact catch rates and lead to trap collapse. Trap condition was noted on the first day and all organisms were counted, identified, measured, and released on the second, fourth and seventh day of fishing. On the seventh day, the entrance funnels on all traps were closed, redeployed, and left undisturbed until the next sampling date. Temperature and salinity measurements was taken monthly at each experimental site using a hand-held YSI Sonde device. Daily catches over the seven-day period of each month for each site were averaged and the entire seasonal average was determined for the period when blue crabs were captured in the traps (April-October; only 3 crabs were captured from November through March). Catch rates between sites and between traps of different ages, were compared using a General Linear Model procedure to conduct a two-way Analysis of Variance (ANOVA) with replication examining the effects of the individual fixed factors "age of traps" and "site", as well as the interactions between factors. Pairwise multiple comparisons of sites were completed with Tukey's HSD test (SPSS 13.0).

We also compared catch rates between unbaited and baited traps to test the self-baiting phenomenon. Fourteen traps were deployed in two locations in August and September: a low salinity site (Guthrie Creek, 5.9% average salinity) and a higher salinity site (Sarah Creek, 19.8% average salinity). Seven traps at each site were baited by placing a dead Atlantic croaker in the upper chamber to simulate the capture of a fish by a derelict trap while the other seven traps were left unbaited. After five days, all traps were checked and the entrapped organisms identified, measured, and released. Differences in blue crab catch rates for baited and unbaited pots were compared with one-way ANOVA (Minitab™).

Results. Side scan surveys identified 676 potential derelict trap targets. Ninety-four percent (16 out of 17) of a subset of side-scan sonar targets in Sarah Creek were correctly identified as derelict blue crab traps resulting in a 6% identification error. Of the derelict trap estimate, 89 crab traps (approximately 14%) were considered abandoned rather than lost because attached floating buoys were present and were identified during the closed season. Of the 33 derelict traps removed from the York River, 27 of them (82%) were still functional. Active and derelict trap surveys in the entire lower York River (33.5 km$^2$), including Sarah Creek, located 635 to 676 potential derelict traps (including 6% possible identification error) with 905 active buoyed traps (863 in the lower York and 42 in Sarah Creek).

Traps continued to fish up to the end of the study period of one year and one month despite being encrusted periodically with fouling organisms. Traps followed fouling trends of a gradual increase in weight over time. However, traps in the mainstem of the lower York River gained weight rapidly in the spring and then lost weight in the late summer due to the growth and dieback of tunicates *Mogula* spp; other trap fouling organisms include barnacles *Balanus* spp., tube weeds

*Polysiphonia* spp., red beard sponge *Microciona prolifera* and hydroids *Bougainvillia carolinensis*. The traps in the lower salinity site in Guthrie Creek were predominantly fouled with hydroids. Subsequent testing has shown vinyl traps to last at least four years.

The overall blue crab catch rate for the experimental traps was 0.24 (crabs·trap day$^{-1}$) for an average of 50.6 crabs per trap over the seven-month period. A total of 641 blue crabs and 172 fish were captured from November 2005 to October 2006 in the experimental traps. In the York River, 12% of the female crabs trapped were egg-bearing. Eleven fish species were observed throughout the experimental sites and the economically important Atlantic croaker had the highest proportion of the finfish catch (29.7%). The average catch rate for Atlantic croaker in the lower York River during the summer season of May to August 2006 was 0.11 fish·trap day$^{-1}$.

Baited and unbaited traps had varying catch rates (One-way ANOVA, p=0.016, df=42), with the traps simulating 'self-baiting' capturing slightly more than double the unbaited traps (mean catch rate 0.79 and 0.39 crabs·trap day$^{-1}$, respectively).

Example 2

We tested various gear modifications that have been proposed to reduce the operational effectiveness of derelict traps, including: degradable cull ring panels; crab traps having a gapped opening (typically provided by memory plastic); and crab traps having a degradable latch (typically provided using a degradable cord material). A crab trap having a degradable cull ring panel was modeled by utilizing a crab trap modified for a degradable cull ring panel of 106 cm$^2$; however, the degradable cull ring panel was not attached (i.e., simulating complete degradation of the degradable cull ring panel). A crab trap having degradable latches was modeled by leaving the latch clip undone to simulate rot cord breakage. Finally, a plastic coat hanger was installed in the crab pot opening to produce a gap intended to simulate rebound plastic in the third crab trap. Three replicate tests were conducted using three randomly selected crabs per each pot. Crabs were placed in the top chamber of the pots and observed at the following time intervals: 1 hr, 2 hr, 3 hr, 4 hr, and 24 hr. The number of crabs that escaped from the pots was recorded.

Figure 4:
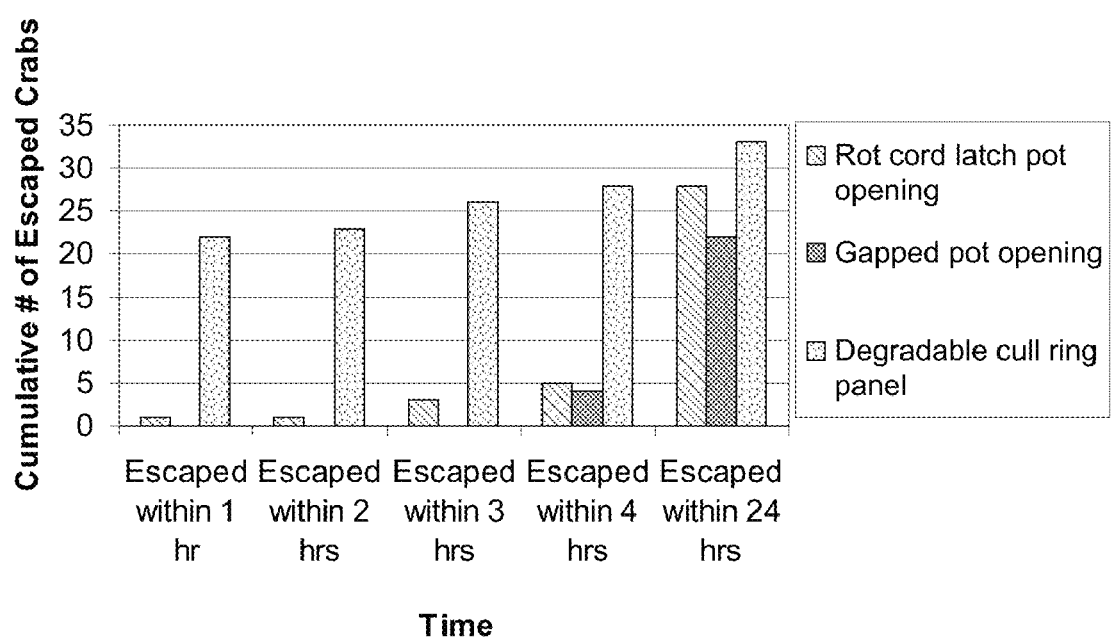
FIG. 4 shows a bar graph plotting, as a function of time, the cumulative number of crabs that escaped crab traps having a degradable cull ring panel.

Results. Seventy eight percent of the crabs entering pots modified with degradable plastic cull ring panels escaped within one hour as compared with pots modified with rot cord latches (14%) and gapped openings (11%), as depicted in FIG. 4.

In addition, a binary logistic regression was utilized to assess the predictability of escape from three types of modification to crab traps that allow for escape after trap loss. The response variable was dichotomous (escape, no escape). Logistic regression applies maximum likelihood estimation to develop a best-fit model of explanatory variables that predict responses, calculating the probability of success over the probability of failure. The results of the analysis are in the form of an odds ratio (the probability of a certain event occurring; e.g., crab escaping).

The odds of escape of crabs within the first four hours from pots modified with degradable cull ring panels was determined to be about five times more likely than either pots modified with degradable rot cord latches or gapped openings.

The results suggest that reducing the functional efficacy of derelict crab traps by utilizing degradable cull ring panels is, in principle, a more crab-friendly method than other methods developed to render derelict crab traps less capable of capturing and killing crabs and other fish.

Example 3

Degradable cull ring panels made from a polyhydroxyalkanoate polymer (Mirel®, available from Telles, a Metabolix/Archer Daniels Midland joint venture, Lowell, Mass.) were field-tested for two months. Degradable cull ring panels of varying thicknesses were produced using the design as shown in FIG. 1B, with approximate maximum dimensions of four inches by six inches. After two months, only very modest degradation was observed in the cull ring panels.

Example 4

Extended field experiments were conducted to test the time required for polycaprolactone degradable cull ring panels to degrade. Degradable cull ring panels were produced having a design as shown in FIG. 1B, with approximate maximum dimensions of four inches by six inches, and thicknesses ranging from approximately 0.5 mm to 2 mm. The degradable cull ring panels were produced from differing formulations of polycaprolactone (supplied by Perstorp UK Ltd., Cheshire, United Kingdom). The formulations were CAPA® 6400, CAPA® 6500, and CAPA® 6800, with higher numbers corresponding to increased average polymer chain length.

Degradable cull ring panels made from polycaprolactone were produced by melting polycaprolactone pellets, pressing the molten polymer to the desired thickness, cooling the resulting sheet, and then die-cutting the final pattern.

Degradable cull ring panels were placed in various crabbing spots in the Chesapeake Bay region, and tested over approximately a 50-day period. Prior testing of other polycaprolactone formulations yielded panels that did not degrade within a one-year time frame.

Results. Degradable cull ring panels made from polycaprolactone yielded a range of degradation times, depending on the thickness of the panel and the polycaprolactone formulation. Table 1 below shows a compilation of results for panels made from the lowest, middle, and highest average molecular weight polycaprolactone that was tested, corresponding to CAPA® 6400, CAPA® 6500, and CAPA® 6800, respectively. Panels were made at various thicknesses, as described above. Obviously, a thicker panel is more resistant to degradation, all else being equal. Prior to field testing, the panels weighed between 2.4 grams and 10 grams. Panels made from the lowest molecular weight polycaprolactone lost, on average, about 0.03 g per day, while panels made from the highest molecular weight polycaprolactone lost about 0.025 grams per day in weight. Panels made from low molecular weight polycaprolactone were far more likely to fail within 50 days, as reflected in the table. While such low molecular-weight polycaprolactone formulations could be utilized for degradable cull ring panels, the thickness of the panel would need to be increased in order to achieve the desired fishing lifetimes, which would add to the cost of goods. The higher average molecular weight (50,000-80,000) polycaprolactone formulations showed suitable degradation rates, providing the desired fishing lifetimes and degradation rates for commercial embodiments using selected degradable cull ring panel designs.

TABLE 1

| Polycaprolactone | Number of Panels Tested | Average Panel Thickness (mm) | Number of Failures | Percentage of Failures | Average Weight Loss Per Day (g) |
|---|---|---|---|---|---|
| CAPA ® 6400 | 28 | 1.18 | 17 | 61% | 0.0300 |
| CAPA ® 6500 | 18 | 1.20 | 4 | 22% | 0.0272 |
| CAPA ® 6800 | 14 | 1.30 | 3 | 21% | 0.0250 |

Incorporation by Reference

All publications, patents, and patent applications cited herein are hereby expressly incorporated by reference in their entirety and for all purposes to the same extent as if each was so individually denoted.

Equivalents

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

The articles "a" and "an" are used herein to refer to one or to more than one (i.e. to at least one) of the grammatical object of the article. By way of example, "a trap" means one trap or more than one trap.

Any ranges cited herein are inclusive.

We claim:

1. A cull ring suitable for attachment to a crustacean trap comprising: a continuous piece of degradable plastic material surrounding an opening;
    wherein said opening is sized with respect to a state's regulation in order to passively cull juvenile crustaceans;
    wherein said degradable plastic material and said opening form a cull ring capable of retaining mature crustaceans within said trap and capable of releasing juvenile crustaceans from said trap;
    wherein said degradable plastic material is capable of degrading in order to increase the size of said opening; and
    wherein the mass of said degradable plastic material decreases by an average of at least 0.1% per day when exposed to an underwater marine environment for 50 days.

2. The cull ring of claim 1, wherein said degradable plastic material is selected from the group consisting of a polyhydroxyalkanoate plastic and a polycaprolactone plastic.

3. The cull ring of claim 1, wherein said crustacean trap is a trap for crustaceans selected from the group consisting of crabs and lobsters.

4. A method of using a cull ring suitable for attachment to a crustacean trap, comprising the steps of:
    (A) providing a cull ring capable of retaining mature crustaceans within said trap and capable of releasing juvenile crustaceans from said trap comprising: a continuous piece of degradable plastic material surrounding an opening wherein said opening is sized with respect to a state's regulation in order to passively cull juvenile crustaceans; and
    (B) exposing said cull ring to a marine environment; and
    (C) degrading said continuous piece of degradable plastic material in order to increase the size of said opening;
    wherein during said step of degrading, the mass of said continuous piece of degradable plastic material decreases by at least 0.1% per day when exposed to said marine environment for 50 days.

5. The method of claim 4, wherein said degradable plastic material is selected from the group consisting of a polyhydroxyalkanoate plastic and a polycaprolactone plastic.

6. The method of claim 4, wherein said crustacean trap is a trap for crustaceans selected from the group consisting of crabs and lobsters.

* * * * *